United States Patent
Kim et al.

(10) Patent No.: US 8,368,358 B2
(45) Date of Patent: Feb. 5, 2013

(54) APPARATUS AND METHOD FOR MANAGING POWER FOR MOBILE DEVICE

(75) Inventors: Kyoung-won Kim, Suwon-si (KR); Hyun-chang Shin, Gunpo-si (KR); Dong-ho Rhee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 219 days.

(21) Appl. No.: 11/505,900

(22) Filed: Aug. 18, 2006

(65) Prior Publication Data

US 2007/0052391 A1 Mar. 8, 2007

(30) Foreign Application Priority Data

Sep. 7, 2005 (KR) .......................... 10-2005-0083325

(51) Int. Cl.
*H02J 7/04* (2006.01)
*H02J 7/00* (2006.01)
(52) U.S. Cl. ........................ 320/162; 320/138
(58) Field of Classification Search .................. 320/152, 320/157–159, 162–164, 138, 106
See application file for complete search history.

(56) References Cited

U.S. PATENT DOCUMENTS

| | | | |
|---|---|---|---|
| 5,867,797 A | 2/1999 | Hashimoto | |
| 6,300,750 B1 * | 10/2001 | Oglesbee et al. | 323/282 |
| 6,507,173 B1 * | 1/2003 | Spiridon et al. | 320/162 |
| 6,509,659 B1 * | 1/2003 | Carroll et al. | 307/125 |
| 6,934,561 B2 * | 8/2005 | Burrus, IV | 455/559 |
| 7,161,265 B2 * | 1/2007 | Barthelemy | 307/116 |
| 7,239,111 B2 * | 7/2007 | Fischer et al. | 320/111 |
| 7,656,623 B2 * | 2/2010 | Fadell et al. | 361/18 |

FOREIGN PATENT DOCUMENTS

| | | |
|---|---|---|
| JP | 08-186623 | 7/1996 |
| KR | 1991-5695 | 7/1991 |
| KR | 1992-10523 | 6/1992 |
| KR | 1994-8189 | 4/1994 |
| KR | 2001-62483 | 7/2001 |
| KR | 2004-9662 | 1/2004 |

OTHER PUBLICATIONS

Office Action issued in Korean Patent Application No. 2005-83325 on Nov. 20, 2006.

* cited by examiner

*Primary Examiner* — Richard V Muralidar
(74) *Attorney, Agent, or Firm* — Staas & Halsey LLP

(57) ABSTRACT

An apparatus and method of managing power for a mobile device is disclosed, which can prevent an inflow of overcurrent to the device when the device is charged. The apparatus includes a state judgment unit to judge whether a battery of the mobile device is being charged, a voltage level detection unit to detect a voltage level of the battery if the battery is judged as being charged, and a control unit to control a driving of the mobile device in accordance with the detected voltage level.

14 Claims, 4 Drawing Sheets

APPARATUS AND METHOD FOR MANAGING POWER FOR MOBILE DEVICE

CROSS-REFERENCE TO RELATED APPLICATION

This application claims the benefit of Korean Application No. 2005-83325, filed Sep. 7, 2005, in the Korean Intellectual Property Office, the disclosure of which is incorporated herein in its entirety by reference.

BACKGROUND OF THE INVENTION

1. Field of the Invention

Aspects of the present invention relate to an apparatus and method of managing power for a mobile device, and, more particularly, to an apparatus and method of managing power for a mobile device that prevents an inflow of overcurrent to the device when the device is charged.

2. Description of the Related Art

Generally, mobile devices, such as mobile phones and personal digital assistants (PDAs) have both a detachable and a rechargeable battery. These batteries are charged using an adapter when the batteries are mounted in the mobile device or when the batteries are separated from the mobile device.

Since a user of a mobile device should always carry an adapter if he/she intends to charge the mobile device while he/she is moving, a method of charging a battery of a mobile device using a universal serial bus (USB), which is a peripheral device connection standard of a computer, has recently been used. According to this method, a USB port provided on the mobile device is connected to a USB port of a personal computer (PC), such as a desktop or a notebook computer, through a specified interface cable, and the battery of the mobile device is charged with power being supplied through the USB port.

FIG. 1 is a schematic view illustrating a mobile device having a battery which is charged using a general adapter. As shown in FIG. 1, an adapter 20, connected to a specified commercial power supply, is connected to a mobile device 10 through a specified interface cable 21. In this case, the adapter 20 converts a commercial power supply (e.g., an AC power supply) into a DC power supply having a specified voltage level, and supplies the converted DC power supply to the mobile device 10. Accordingly, a battery of the mobile device 10 is charged with the DC power supply being supplied through the adapter 20.

FIG. 2 is a schematic view illustrating a mobile device of which the battery is charged using a general PC. As shown in FIG. 2, where a port provided on a mobile device 10 is connected to a port provided on a PC 30 through a specified interface cable 31, either the mobile device 10 transmits/ receives data to/from the PC, or a battery of the mobile device 10 is charged through the interface cable 31. This method of charging a battery of a mobile device through a PC is frequently used by office workers since most office workers use PCs for their business.

However, where a battery of a mobile device is charged using the port provided on the PC 30, a power level that is supplied through the port is generally fixed, while an adapter to charge a battery of a mobile device is manufactured according to the standard of a power level (e.g., voltage and current) suitable for a specified mobile device. For example, the voltage/current that can be supplied through a USB port of the PC 30 is generally set to 5V/500 mA.

On the other hand, if the mobile device is in a low-battery state, i.e., if the power required to drive the mobile device 10 is insufficient, the mobile device 10 maintains a minimum power level to protect the system. Generally, when the mobile device 10 maintains the minimum power state, the mobile device 10 is maintained in a power-off state.

Generally, no abnormal phenomenon occurs when charging the battery of the mobile device 10 through the port provided on the PC 30 where the power of the mobile device 10 is turned off due to the low-battery state of the mobile device 10. However, when a user turns on the power just after the battery is charged, the mobile device 10 instantaneously secures current required to drive the system of the mobile device 10. This may result in overcurrent flowing into the mobile device 10. If the overcurrent flows into the mobile device 10, the voltage level required to drive the system of the mobile device 10 is relatively lowered to cause the necessary voltage level to not be secured.

Accordingly, as soon as the user turns on the power of the mobile device 10, the mobile device 10 may be switched to the minimum power state, or an abnormality may occur in the system of the mobile device 10.

Korean Patent Unexamined Publication No. 2004-9662 discloses an apparatus and a method of automatically turning on the power of a mobile communication terminal when the charging of a battery of the mobile terminal is completed where the power of the mobile terminal is turned off. However, this publication does not disclose a scheme of preventing an inflow of overcurrent to the mobile terminal when the power of the mobile terminal is turned on simultaneously with the start of charging the battery in a state that the mobile terminal is in a low-battery state.

SUMMARY OF THE INVENTION

Accordingly, aspects of the present invention solve the above-mentioned and/or other problems occurring in the related art, and to provide an apparatus and a method of managing power for a mobile device capable of preventing an abnormal phenomenon which may occur in a system of the mobile device by preventing an inflow of overcurrent to the mobile device that may occur when the power of the mobile device is turned on just after the start of charging the battery.

In order to accomplish these and/or other aspects, there is provided an apparatus to manage power for a mobile device, which includes a state judgment unit to judge whether a battery of the mobile device is being charged, a voltage level detection unit to detect a voltage level of the battery if the battery is being charged as a result of the judgment, and a control unit to control whether to drive the device in accordance with the detected voltage level.

In another aspect of the present invention, there is provided a method of managing power for a mobile device, comprising judging whether a battery of the mobile device is being charged, detecting a voltage level of the battery if the battery is judged as being charged, and controlling a driving of the mobile device in accordance with the detected voltage level.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
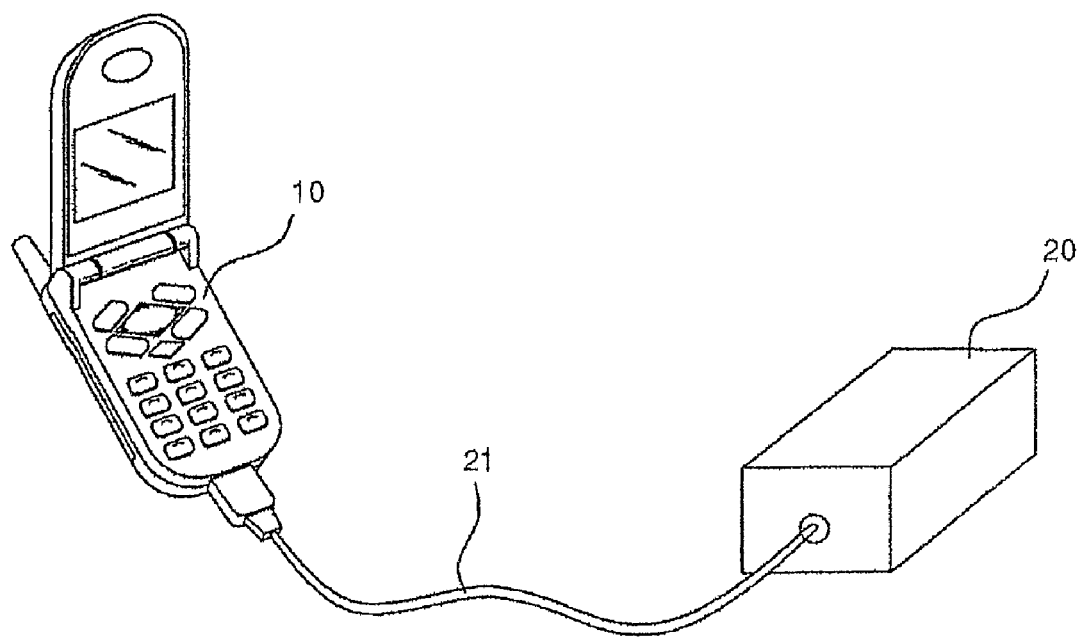
FIG. 1 is a schematic view illustrating a mobile device the battery of which is charged using a general adapter.
Figure 2:
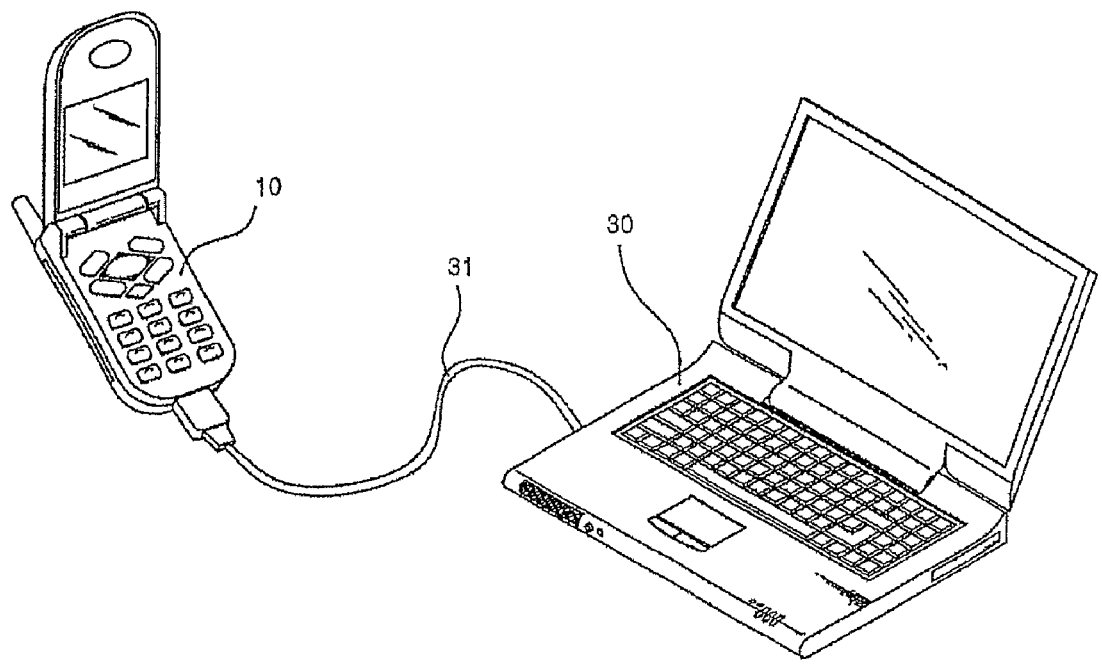
FIG. 2 is a schematic view illustrating a mobile device of which the battery is charged using a general PC.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, allow for the implementing of the functions specified in the flowchart block or blocks.

These computer program instructions may also be stored in a computer usable or computer-readable memory that directs a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations to implement the functions specified in the flowchart block or blocks.

Also, each block of the flowchart illustrations may represent a module, segment, or portion of code, which comprises one or more executable instructions to implement the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 3:
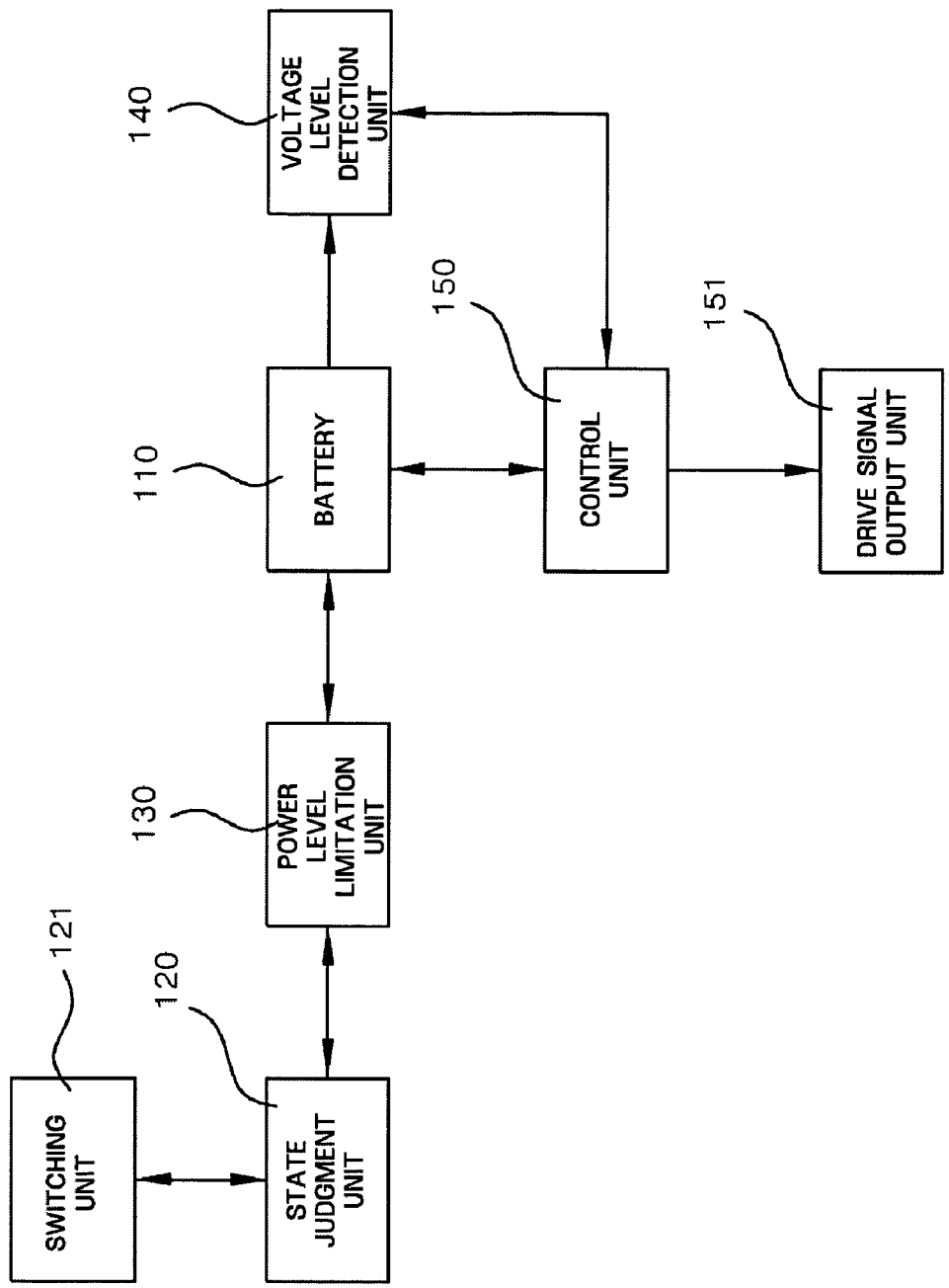
FIG. 3 is a block diagram illustrating the construction of an apparatus to manage power for a mobile device according to an embodiment of the present invention.

FIG. 3 is a block diagram illustrating the construction of an apparatus to manage power for a mobile device according to an embodiment of the present invention. As shown in FIG. 3, the apparatus includes a battery 110, a state judgment unit 120 to judge the charging state of the battery, a power level limitation unit 130 to limit the level of power that is used for a battery charging, a voltage level detection unit 140 to detect a voltage level of the battery 110, and a control unit 150 to control whether to drive the mobile device in accordance with the detected voltage level.

The state judgment unit 120 judges whether the battery 110 is charged through a dedicated adapter or through a USB port of a PC, and judges whether the battery is being charged. In other words, the state judgment unit judges the type of an interface to charge the battery 110. In this case, the state judgment unit 120 judges the type of the connected interface (i.e., whether the mobile device is connected through an adapter or a USB port, through a type of an interface cable connected to the mobile device or the type of a signal being transmitted/received).

In the embodiment of the present invention, the battery 110 is charged using a USB port of a PC in addition to the dedicated adapter. However, the present invention is not limited to this arrangement, and diverse interfaces such as those described in the IEEE 1394 standard may also be used to provide the power supply.

In addition, the state judgment unit 120 controls a switching unit 121 that switches paths through which the power is transferred in accordance with the type of an interface connected to the mobile device. According to an embodiment of the present invention, the switching unit 121 comprises switching elements (e.g., transistors) that switch circuit paths to transfer the power being supplied under the control of the state judgment unit 120. That is, the power being supplied may be directly transferred to the battery of the mobile device or to the battery through a power management device of the mobile device, in accordance with an interface connected to the mobile device such as an adapter or a USB port.

Where the power being is transferred to the battery through the power management device of the mobile device (i.e., the adapter), which may supply a sufficient power to the battery to match the standard of the corresponding mobile device, as the interface, the power is directly supplied to the mobile device without passing through a separate process, while in the case of using the USB port, through which a limited power is supplied, the power is supplied to the mobile device through a corresponding path that is selected according to the type of an interface used for the supplying of the power.

The power level limitation unit 130 limits the level of the power used to charge the battery 110 when the battery 110 is charged through a specified interface (e.g., an adapter or a USB port). According to an embodiment of the present invention, the power level limitation unit 130 limits the power level used to charge the battery 110 to 5V/500 mA, and the power level that is limited by the power level limitation unit 130 may be changed according to the standard of the mobile device.

The voltage level detection unit 140 detects the voltage level of the battery 110 when the battery is charged. If the detected voltage level of the battery 110 reaches a predetermined reference power level, the voltage level detection unit 140 outputs a specified signal. As described above, if the power of the mobile device is turned on just after the start of charging the battery 110, an overcurrent flows to the mobile device, which requires a large current to drive the system, and, thus, a relatively low voltage level, to cause an abnormal phenomenon to occur in the system of the mobile device. The term "reference power level" refers to a power level which prevents the abnormal phenomenon from occurring in the system of the mobile terminal as described above. In an embodiment of the present invention, it is exemplified that the reference power level is set to 3.7V, although, it is understood that there are other voltages that could be employed to prevent the abnormal phenomenon of an overcurrent flow from occurring.

The control unit 150 outputs a control signal to determine whether to drive the mobile device in accordance with the output signal of the voltage level detection unit 140. In other words, if the specified signal is outputted from the voltage level detection unit 140, the control unit 150 judges that the battery 110 has been charged with the power over the reference power level. Otherwise, the control unit 150 judges that the battery 110 has not been charged with the power over the reference power level.

If it is judged that the battery 110 has been charged with the power over the reference power level, the control unit 150 judges that sufficient voltage level to drive the system of the mobile device has been secured even if the power of the mobile device is turned on, and, thus, controls the power of the mobile device to be turned on. By contrast, if it is judged that the power being charged does not reach the reference power level, the control unit 150 judges that the voltage level may be reduced due to an inflow of overcurrent if the power of the mobile device is turned on, and controls the power of the mobile device to not be turned on.

Specifically, the control unit 150 controls a drive signal output unit 151 to output a drive signal to activate a power button provided on the mobile device if it is judged that the battery has been charged with the power over the reference power level. Otherwise, the control unit controls the drive signal output unit 151 to not output the drive signal.

Accordingly, in the event that the voltage level of the battery 110 does not reach the reference voltage level, the power is not turned on even if a user presses the power button. Thus, an inflow of overcurrent to the mobile device is prevented, in advance.

Hereinafter, a method of managing power for a mobile device according to an embodiment of the present invention will be explained in detail.

Figure 4:
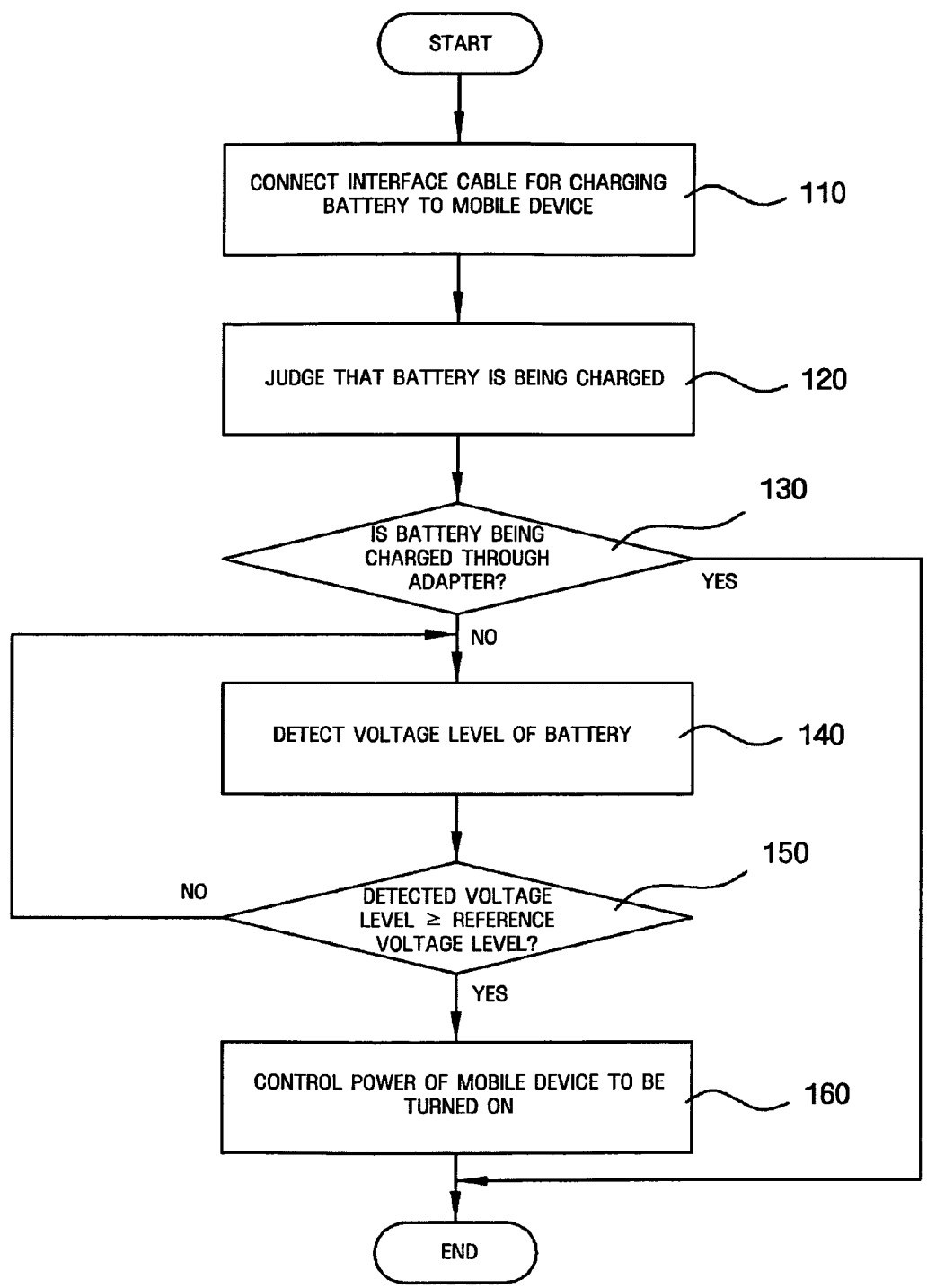
FIG. 4 is a flowchart illustrating a method of managing power for a mobile device according to an embodiment of the present invention.

FIG. 4 is a flowchart illustrating a method of managing power for a mobile device according to an embodiment of the present invention.

According to the method, it is understood that a battery 110 of the mobile device is charged with the battery 110 being in a minimum power mode, i.e., the power of the mobile device is turned off. Also, according to the method, it is understood that the battery 110 of the mobile device is charged through a USB port or an IEEE 1394 compatible port that is provided on a PC such as a desktop computer or a notebook computer.

As is illustrated in FIG. 4, the mobile device is first connected to a device that provides power to charge the battery 110 of the mobile device through a specified interface cable when the battery 110 is charged (operation 110).

If the interface cable is connected to the mobile device, the state judgment unit 120 judges that the mobile device is in a charging state (operation 120).

In addition, the state judgment unit 120 judges whether the battery 110 of the mobile device is charged through an adapter by checking the connected interface cable (operation 130). In other words, the state judgment unit judges whether the battery 110 of the mobile device is charged through an adapter or a USB port of a PC in accordance with the type of the interface cable connected to the mobile device. As described above, where the mobile device is charged through the adapter, which may supply a sufficient power to the mobile device, turning on the power of the mobile device just after the start of charging does not present a problem, while where the mobile device is charged through the USB port of the PC, an inflow of overcurrent may occur when the power of the mobile device is turned on just after the start of charging.

If it is judged that the battery 110 is charged though the USB port of the PC, the voltage level detection unit 140 detects the voltage level of the battery 110 being charged (operation 140). At this time, the level of power being supplied when the battery 110 is charged may be limited to a specified power level.

Here, the voltage level detection unit 140 compares the detected voltage level of the battery 110 with a reference voltage level (operation 150). If the detected voltage level exceeds the reference voltage level, the voltage level detection unit 140 outputs a specified signal to the control unit 150.

When the specified signal is received from the voltage level detection unit 140, the control unit 150 judges that a voltage level that is sufficient to drive the system of the mobile device has been secured even if the power of the mobile device is turned on, and, thus, allows the mobile device to be turned on (operation 160). For example, when a user turns on the power of the mobile device through a power button provided on the mobile device, the control unit 150 controls the drive signal output unit 151 to output the drive signal to activate the power button. By contrast, if the specified signal is not received, the control unit 150 judges that the voltage level may be reduced due to an inflow of overcurrent, and controls the drive signal output unit 151 not to output the drive signal, and, thus, not allow the mobile device to be turned on.

On the other hand, in the case in which the mobile device is charged through the adapter in operation 130, the adapter supplies a sufficient power to the mobile device, and, thus, the mobile device may be directly turned on without performing the above-described operations 140 to 160.

According to the embodiments of the present invention, the term "unit", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As is described above, according to aspects of the apparatus and the method to manage power for a mobile device according to the present invention, the drop of the voltage level to drive the mobile device, which occurs due to an inflow of overcurrent to the mobile device when the power of the mobile device is turned on just after the start of charging the battery, may be prevented, and, thus, the occurrence of an abnormal phenomenon in the system of the mobile device, which includes a power turn-off, may also be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to manage power for a mobile device, the apparatus comprising:
   a state judgment unit to judge whether a battery of the mobile device is being charged and to judge whether an interface connected to a port provided for the charging of the battery of the mobile device is of a first interface type or a second interface type;
   a voltage level detection unit to detect a voltage level of the battery when the battery is judged as being charged by the second interface type; and a control unit to prevent the mobile device from being turned on when the voltage level detected by the voltage level detection unit is less than a predetermined reference voltage level and when the state judgment unit judges that the battery of the mobile device is being charged by the second interface type, the control unit to allow the mobile device to be turned on even when the voltage level detected by the voltage level detection unit is less than a predetermined reference voltage level when the state judgment unit judges that the battery of the mobile device is being charged by the first interface type.

2. The apparatus of claim 1, further comprising:
a power level limitation unit to limit a power level supplied to the battery when the battery is being charged; and
a drive signal output unit to output a drive signal to drive the mobile device under the control of the control unit.

3. The apparatus of claim 1, wherein the voltage level detection unit transfers a specified signal to the control unit if the detected voltage level exceeds the predetermined reference voltage level.

4. The apparatus of claim 3, wherein the control unit controls a driving of the mobile device in accordance with an existence/nonexistence of the transferred signal.

5. The apparatus of claim 1, wherein the second interface type obtains power from a computer for the charging of the battery of the mobile device from a computer.

6. The apparatus of claim 1, wherein the second interface type connects to an IEEE 1394-compatible port of a computer.

7. A method of managing power for a mobile device, the method comprising:
judging whether a battery of the mobile device is being charged;
judging whether an interface connected to a port provided for the charging of the battery of the mobile device is of a first interface type or a second interface type;
detecting a voltage level of the battery when the battery is judged as being charged by the second interface type; and
controlling the mobile device by preventing the mobile device from being turned on when the detected voltage level is less than a predetermined reference voltage level and when the battery of the mobile device is judged as being charged by the second interface type, while allowing the mobile device to be turned on even when the detected voltage level is less than a predetermined reference voltage level when the battery of the mobile device is judged as being charged by the first interface type.

8. The method of claim 7, further comprising limiting the power level supplied to the battery when the battery is being charged.

9. The method of claim 7, wherein the judging of whether the battery is being charged comprises:
judging whether the battery is being charged in accordance with the judging the type of interface network cable.

10. The method of claim 7, wherein the controlling of the mobile device comprises controlling a driving of the mobile device in accordance with an existence/nonexistence of the output signal.

11. The method of claim 10, wherein the controlling of the driving of the mobile device comprises outputting a drive signal corresponding to the output signal.

12. The method of claim 7, wherein the second interface type obtains power from a computer for the charging of the battery of the mobile device from a computer.

13. The method of claim 7, wherein the second interface type connects to an IEEE 1394-compatible port of a computer.

14. An apparatus to manage power for a mobile device, the apparatus comprising:
a state judgment unit to judge whether a battery of the mobile device is being charged by an adaptor or by an IEEE 1394-compatible port of a computer;
a voltage level detection unit to detect a voltage level of the battery when the battery is judged as being charged by the IEEE 1394-compatible port of the computer; and
a control unit to prevent the mobile device from being turned on when the voltage level detected by the voltage level detection unit is less than a predetermined reference voltage level and when the state judgment unit judges that the battery of the mobile device is being charged by the IEEE 1394-compatible port of the computer, the control unit to allow the mobile device to be turned on even when the voltage level detected by the voltage level detection unit is less than a predetermined reference voltage level when the state judgment unit judges that the battery of the mobile device is being charged by the adapter.

* * * * *